United States Patent [19]
Brede et al.

[11] 3,870,894
[45] Mar. 11, 1975

[54] ELECTRONIC SENSOR FOR TRIGGERING SAFETY DEVICES DURING THE CRASH OF VEHICLES

[75] Inventors: Uwe Brede, Schwaig; Karl-Egon Flach, Cologne-Riehl; Heinz Gawlick, Furth, Bayern; Günter Hirschmann, Volkach am Main; Walter Kreibich, Furth, all of Germany

[73] Assignee: Dynamit Nobel Aktiengesellschaft, Troisdorf, Germany

[22] Filed: Feb. 20, 1973

[21] Appl. No.: 334,023

[30] Foreign Application Priority Data
Feb. 19, 1972  Germany............................ 2207831

[52] U.S. Cl. .................. 307/9, 180/91, 307/121, 340/52 H
[51] Int. Cl. ........................................ H01h 35/14
[58] Field of Search .................. 307/10 R, 9, 121; 340/52 H; 180/82, 91; 280/150 AB; 102/70.2

[56] References Cited
UNITED STATES PATENTS

| | | | |
|---|---|---|---|
| 3,629,816 | 12/1971 | Gillund | 340/52 H |
| 3,633,159 | 1/1972 | Dillman et al. | 340/52 H |
| 3,668,627 | 6/1972 | Brainerd | 340/52 H |
| 3,701,903 | 10/1972 | Merhar | 307/9 |
| 3,714,627 | 1/1973 | Dillman et al. | 340/52 H |
| 3,716,828 | 2/1973 | Massa | 310/8.7 X |

Primary Examiner—Robert K. Schaefer
Assistant Examiner—William J. Smith
Attorney, Agent, or Firm—Craig & Antonelli

[57] ABSTRACT

An electronic sensing system for triggering the activation of a safety mechanism of a vehicle during a vehicle collision. The system includes a piezoelectric transducer providing an output indicative of shock acceleration of the vehicle, an evaluating and safety circuit for processing the output of the transducer in accordance with predetermined dynamic deformation characteristics of the vehicle and for providing a triggering output signal to an ignition circuit for activating the safety mechanism such as an air bag system. The evaluating and safety circuit provides a triggering output signal depending upon whether at least one of a predetermined threshold value has been attained by the output signal of the transducer and that the value is maintained for a predetermined delay period.

34 Claims, 8 Drawing Figures

ELECTRONIC SENSOR FOR TRIGGERING SAFETY DEVICES DURING THE CRASH OF VEHICLES

The present invention relates to an electronic sensor for the triggering of safety devices in vehicles of all kinds when the vehicles are driven against an obstacle or are in collision with another vehicle.

Triggering devices or systems for the actuation of safety mechanisms in automotive vehicles for the protection of the passengers during impact against an obstacle are known. However, these systems generally have triggering sensors formed by an acceleration-dependent, mechanical switching mechanism which in conjunction with an electric ignition circuit, ignites one or more electric igniting elements. Even in connection with an electronic monitoring and control circuit, these mechanical switches have substantial disadvantages, namely, on the one hand, there is a long delay in response time in the so-called "crash case" between the beginning of the deceleration upon impact and the actual triggering of the mechanism, and, on the other hand, the mechanism is highly sensitive to minor shock impacts and thus prone to be triggered accidentally.

It is an object of the present invention to provide a triggering sensor which, on the one hand, operates with great sensitivity and with minimum delay when an actual crash situation occurs and, on the other hand, does not lead to triggering in any case upon a harmless shock-like stress, vibrations, or the like.

In accordance with the present invention, there is provided an electronic sensor for the triggering of safety mechanisms during the impact of vehicles, which sensor is characterized by a piezoelectric acceleration pickup transducer means, an evaluation and safety switching circuit adapted to the dynamic deformation characteristic of the vehicle, as well as an ignition circuit which can be triggered on the basis of the generated piezoelectric voltage.

The evaluation and safety switching circuit of the present invention ensures that the sensor responds only in case of a crash situation. It has been found that in the case of a crash, the direction or polarity of the positive or negative acceleration, i.e. acceleration or deceleration, respectively, remains unchanged over a time period of at least approximately 10 milliseconds. When plotting the magnitude of the deceleration measured in the crash situation in dependence on the time, this curve, which is alsso called deceleration-time characteristic, does not have a zero transition at least during approximately the first 10 ms. The actual curve of the deceleration-time characteristic in the individual case depends on the vehicle speed upon impact, the mass of the vehicle, the proportion of kinetic energy converted into deformation work, etc. However, in any event, it is a characteristic phenomenon that the acceleration or deceleration does not change its polarity over a longer initial time period.

In contradistinction therto, it has been found that in case of short-term disturbances by impact stresses, as they occur during driving, for example, by a thrown stone or in repair workshops by the action of impact tools, or in case of vibrations of the car body, the deceleration changes its polarity several times within a time period of, for example, 1-3 ms. Correspondingly, the curve of the associated deceleration-time characteristic thus exhibits an analogous number of zero transitions.

This basic difference in the deceleration-time characteristic can be detected, in an advantageous embodiment of the present invention, by means of a deceleration stage provided in the evaluation and safety switching circuit and can be employed for the defined triggering of the sensor. In accordance with a feature of the present invention, by setting the deceleration stage, in dependence on the deceleration-time characteristics of the respective vehicle type, at a delay time of between about 1 and 50 ms., for example 10 ms., the delay stage, as a consequence thereof, transmits the ignition signal to the ignition circuit associated therewith only in the case that the deceleration curve does not pass through zero during this period of 10 ms. The longer the delay period is set, the more secure is the sensor, on the one hand, against harmless impact and vibration stresses, whereas the sensor, on the other hand, also becomes less sensitive to already dangerous impact crash situations. For the usual types of vehicles and driving conditions, values in the range of between 3 and 6 ms. have been found to be optimum values for the delay time.

In order to prevent the sensor from responding at each normal braking operation, an electric component is inserted in the evaluation and safety switching circuit, according to a further feature of this invention. This electric component determines a lower threshold value for the deceleration and can be, in principle, between 2 and 50 g. or thereabove. However, it is advantageous to fix this value in the range of 2–10 g. The threshold value is adapted to the deformation behavior of the vehicle and provides that the triggering takes place only if the deceleration curve, after exceeding the acceleration threshold value, remains above this value at least for the predetermined deceleration period.

It is a further advantageous feature to provide the evaluation and safety circuit with a filter element which filters out the higher frequency oscillations which are superimposed on the deceleration-time curve in case of a crash. In order to trigger the sensor, the signal produced by the acceleration pickup transducer means is amplified and can be used for the control of a triggering device, the output signal of which is applied to the timer of the delay stage. However, according to another feature of this invention, the ignition circuit can also be triggered by an integrator, during which step a voltage is produced which is proportional to the integral of the deceleration-time curve. This voltage is then capable of triggering the ignition circuit if it lies above the triggering threshold fixedly set in the integrator, which triggering threshold is determined in correspondence with the deformation characteristic of the respective vehicle type and the other variables. A set integral value corresponds to the set tripping threshold, so that the actual tripping takes place, at varying speeds, also in accordance with varying delay times. Thus, the delay time is dependent on the speed, in this connection. In this embodiment, the integrator simultaneously serves as the filter and the delay stage. The integrator can advantageously be formed from the triggering circuit by an appropriate choice of the circuit components.

The natural frequency of the piezoelectric pickup transducer means is selected to be very high, preferably between 10 and 100 kilohertz so that every signal is transmitted, even one of a high frequency such as result from minor impacts or by vibrations of the body of an automotive vehicle. In order to increase the sensitivity of the piezoelectric pickup transducer means, it is advantageous to bias the piezoelectric pellet of the transducer.

In accordance with a further feature of the present invention, a reserve energy source is advantageously provided, for example in the form of a capacitor, which ensures that even in the event of a possible failure of the vehicle circuit network, the sensor still remains functional for a certain time period, for example 30 seconds to 5 minutes.

In order to control the functionality of the sensor and to avoid erroneous trippings, a control unit is advantageously provided which, upon the failure of any of the components, signals a disturbance and simultaneously prevents erroneous triggering due to this failure.

These and further objects, features and advantages of the present invention will become more obvious from the following description when taken in connection with the accompanying drawings which show, for purposes of illustration only, several embodiments in accordance with the present invention, and wherein.

Figure 1:
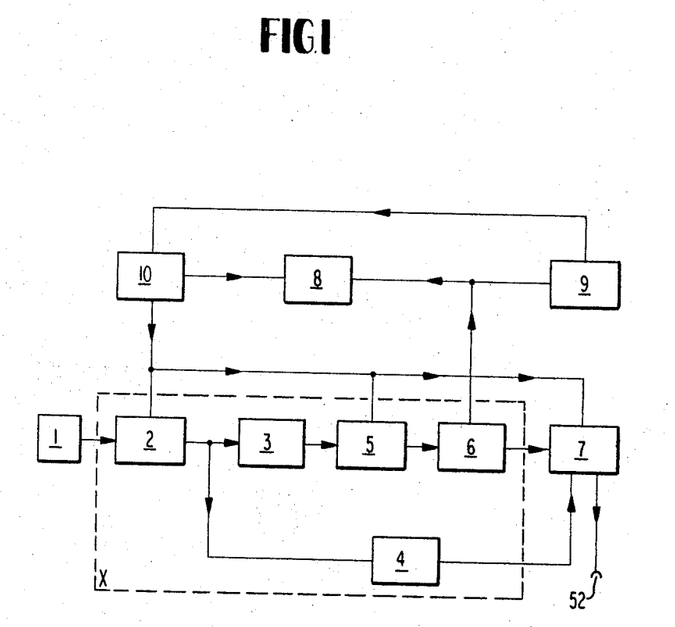
FIG. 1 shows a block circuit diagram for the sensor of the present invention with a discretely settable, acceleration-dependent switching threshold in conjunction with a discretely settable triggering delay period.

Referring now to the drawings wherein like reference numerals are utilized to designate like parts throughout the several views, there is shown in FIG. 1 a sensor system including a piezoelectric pickup transducer means 1 which transmits a signal to an evaluation and safety switching circuit X. The circuit includes an amplifier 2, a filter 3, and a trigger member 5, followed by a delay member 6, and a safety switching circuit 4. The delay unit 6 serves for igniting an ignition circuit 7 when a signal exceeds the set predetermined threshold value of the deceleration-time characteristic for a likewise predetermined set time interval, unless there is a disturbance signal emitted by the safety switching circuit 4.

For reasons of safety with respect to operational and functional control, a control element 8 is provided which, on the one hand, controls the energy or power source 10 formed by the battery or electrical system of the vehicle and, on the other hand, controls, via the energy requirement of the total circuit, the functional parts of the active switching circuit, consisting of component members 2, 3, 5, 6 and 7. Additionally, a reserve energy source 9 is provided which, after failure of the vehicle circuit 10, ensures the operation of the sensor system for a certain period of time.

Figure 3:
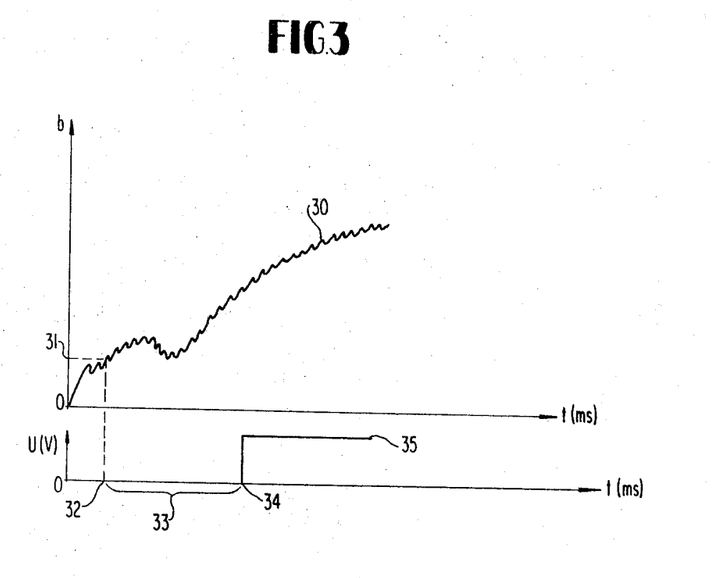
FIGS. 3 and 4 show the deceleration-time curve at different impact velocities, utilizing the sensor system according to FIG. 1, FIGS. 5 and 6 show deceleration time curve at different impact velocities as in FIGS. 3 and 4 utilizing the sensor system illustrated in FIG. 2.

In FIG. 3, the time $t$ is plotted on the abscissa, while the deceleration $b$, which is normally measured in $g.$ = gravitational acceleration, is plotted on the ordinate. The deceleration-time curve 30 of this figure shows the typical source for an impact of a vehicle at a relatively high speed, for example of an automotive vehicle at 70 km./h. After reaching a certain threshold value 31 for the deceleration, e.g. 7 g., the trigger member 5 exhibits a switching characteristic and thus starts the time delay stage 6. After a time period 33, namely the set delay time period, for example, 3 ms. and starting with the instant 32, at which the trigger member is switched, the ignition circuit 7 is ignited at the instant 34, by applying, according to the curve 35, an ignition voltage U to the igniter output 52 of the ignition circuit 7 as shown in FIG. 1.

Figure 4:
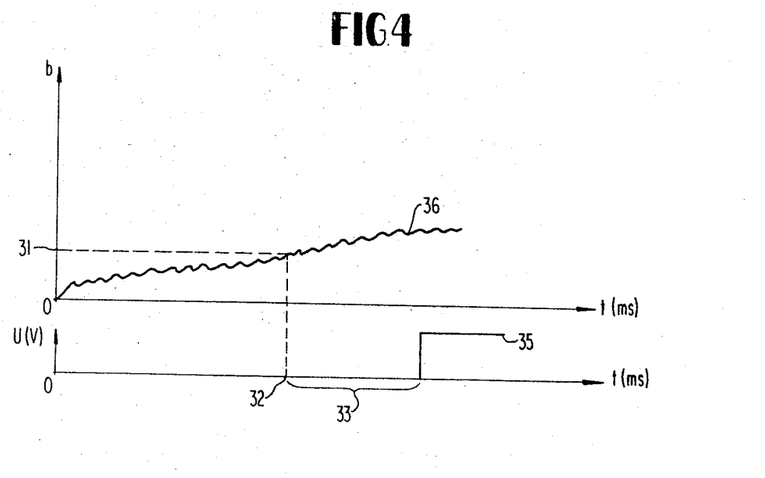

In FIG. 4, there is shown a curve wherein the impact velocity of the vehicle is lower than that of FIG. 3, about 20–30 km./h., so that the deceleration-time curve 36 is flatter, whereby trigger 5 initiates the time delay stage 6 only at a later instant 32. As shown, after the delay period 33, the ignition circuit is actuated.

Normally, the curves are superimposed by higher-frequency oscillations, which, however, are already filtered out in the amplifier 2 or by devices such as the filter 3 arranged at the output of the amplifier 2. The curves are clearly different from zero and posses a specific polarity. A shock and/or a vibrational stress, in contrast thereto, produces a deceleration-time curve which is clearly different from the crash impact curves, since the pattern of this curve resembles a damped oscillation about the zero point, i.e. transitions through zero occur, and thus there is no defined polarity characteristic. Furthermore, such a curve has steeply ascending flank portions and the frequency is very high, so that the possibility is provided to block the tripping of the ignition circuits by these oscillations. By measuring the deceleration-time characteristic during the impact of a great variety of vehicle types against obstacles in the speed range of 15–75 km./h., it has been found that even at a high velocity with a very still buckling zone of the vehicle, decelerations times of above 1–2 ms. must still be required. However, the frequency associated with a time of about 1 ms. is already 1 kilohertz, i.e. shock-like stresses are definitely above this value in frequency range and ascension characteristic.

If, after amplication by the amplifier 2, a disturbance-indicating signal occurs which in any event has negative amplitudes in a time period of about 1 ms., the safety device circuit 4 begins to function and short-circuits the control circuit in the ignition circuit, so that a signal from the time delay member 6 cannot trigger the ignition circuit 7.

Figure 2:
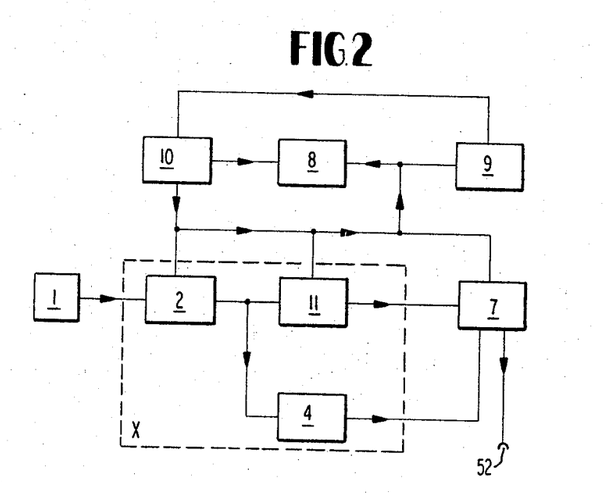
FIG. 2 shows the block circuit diagram of a sensor system of this invention with a speed-dependent triggering characteristic.
Figure 5:
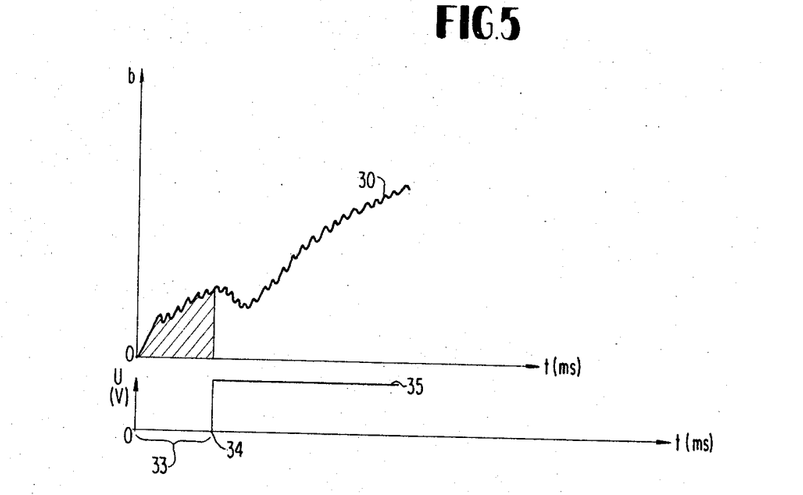
Figure 6:
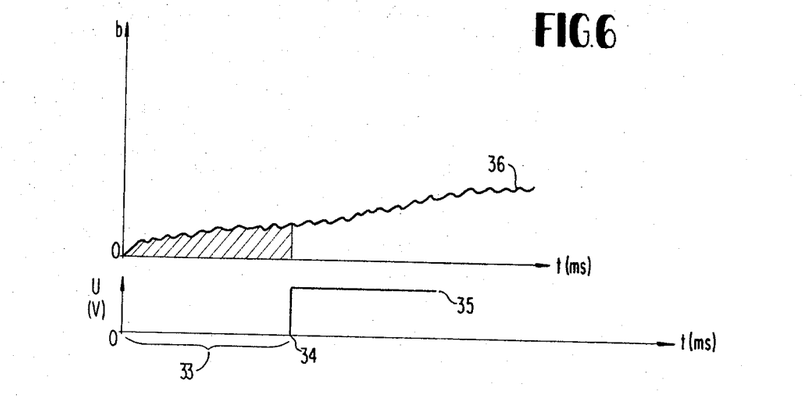

The sensor system illustrated in FIG. 2 provides a variable delay time period 33, i.e., the ignition of the ignition circuit 7 takes place in dependence on the speed. The ignition circuit is triggered in this embodiment by integration of the deceleration-time curve up to a predetermined value. The shaded areas underneath the curves 30 and 36 in FIGS. 5 and 6 thus represent the same integration values for a specific sensor system while the delay times 33 are different, due to the different patterns of the impact crash curves. That is, the predetermined integration threshold value is attained in different time intervals.

In this embodiment, the signal produced at the piezoelectric pickup transducer means 1, for example, in case of a collision is supplied via an amplifier 2, to an integrator 11, whereupon the ignition signal is transmitted to the ignition circuit 7 in correspondence with the threshold value of the integrator, unless a disturbance-indicating signal is received from the safety unit 4. The triggering threshold set in the integrator 11 corresponds to a definite integral value adapted to the respective vehicle characteristic. The current supply, as well as the operational and functional control is effected as in the arrangement shown in FIG. 1 and the evaluating and safety switching circuit X is formed in this embodiment by the amplifier 2, the integrator 11, and the safety unit 4.

Figure 7:
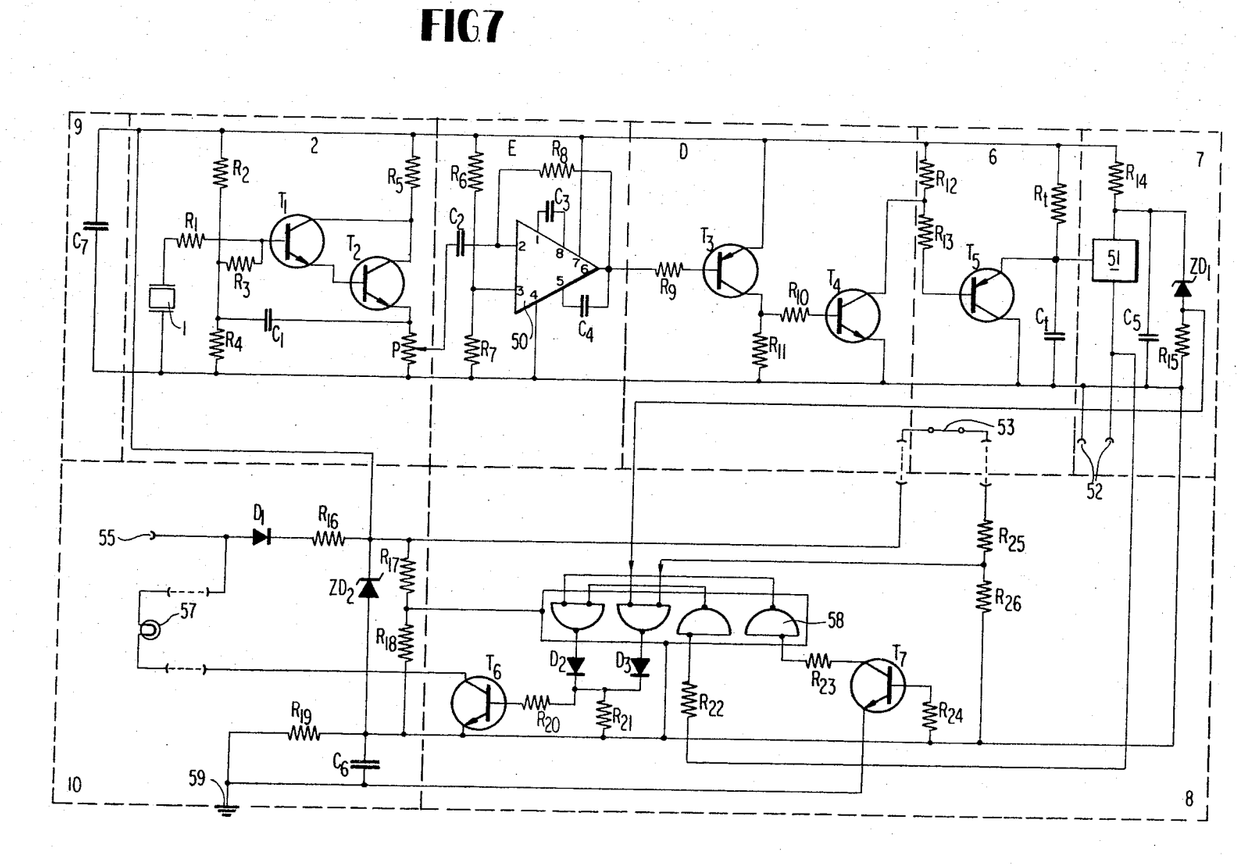
FIG. 7 shows the schematic circuit diagram for a sensor system of the block circuit diagrams of FIG. 1 or FIG. 2.

FIG. 7 shows a circuit diagram of a preferred circuit arrangement for the sensor system of this invention in accordance with the embodiments of FIGS. 1 and 2, illustrated in connection with an air bag system of an automotive vehicle. However, all components described herein can be replaced by equivalent elements. The signal is produced at the piezoelectric pickup transducer means 1 and utilized, via the resistor $R_1$, for driving a transistor $T_1$, which latter, in turn, drives the transistor $T_2$ connected in cascade therewith. The output of the transistor $T_2$ is connected to a potentiometer P which may be replaced by a voltage divider circuit. Additionally, the output of the trnsistor $T_2$ is fed back to the transistor $T_1$ via the capacitor $C_1$ and the resistor $R_3$. Thus, an impedance amplifier 2 is formed by the resistors $R_1$, $R_2$, $R_3$, $R_4$, $R_5$, the transistors $T_1$, $T_2$, the capacitor $C_1$, and the potentiometer P, and serves for producing, independently of the temperature, a current from the voltage produced at the piezoelectric pickup means 1, in order to keep the response tolerances of the sensor at a minimum.

The voltage derived from the central tap of the pontentiometer P is also amplified in an amplifier stage E consisting of an integrated amplifier component 50, for example, the commercially available component TAA 522, the capacitors $C_2$, $C_3$, $C_4$, the resistors $R_6$, $R_7$, and $R_8$. A further amplifier stage D is connected after the amplifier stage E, consisting of the transistors $T_3$ and $T_4$, as well as the resistors $R_9$, $R_{10}$, and $R_{11}$. This portion of the circuit exhibits a switching behavior when a specific deceleration value has been reached at the piezoelectric pickup means 1. The output is supplied to the delay stage 6 having a transistor $T_5$ which is normally conducting so that the capacitor $C_t$ of the subsequent timer, consisting of capacitor $C_t$, and the resistor $R_t$, cannot be charged. However, when the trigger member 5 of FIG. 1, here illustrated by the switching circuit D, is switched, the transistor $T_5$ is blocked, whereby the timing element $R_tC_t$ of the delay stage 6 is activated. The delay stage 6 also contains the resistors $R_{12}$ and $R_{13}$. In the event no disturbance is registered by the safety switching circuit 4, the timer operates until the ignition voltage of the ignition circuit 7 is attained, whereupon an ignition circuit 7 is triggered and an igniter output is provided at terminals 52.

The safety switching circuit 4 which is illustrated as a separate component in FIG. 1, is formed by the total circuit components in FIG. 7. In the case of a disturbing oscillation, as occurs in case of thrown stone, etc. the transistor $T_5$ is driven by the components connected in front thereof in such a manner that the timer $R_tC_t$ is always reset to zero, since such oscillations have several zero transitions during the fixed delay time set by the timer.

The filter 3 illustrated in FIG. 1 is formed by the capacitors $C_1'$, $C_2$ as well as $C_3$ and $C_4$. This filter, however, can also be formed by the amplifier 50 and the capacitor $C_3$. The ignition circuit 7 is constituted by the resistor $R_{14}$, the switching module 51, and the capacitor $C_5$ and the switching module 51 has the behavior of a thyristor in the anode-cathode path and the characteristic of an accurately switching trigger diode in the control circuit. This module is advantageously dimensioned so that it has a maximum control current of 10 $\mu$A, an anode voltage range of 5 V to 80 V, and a surge current of 10 A. Thereby, the module is capable of switching at a fixedly predetermined voltage value with only very minor tolerances. This component is an integrated switching circuit which, however, may also be replaced by equivalent elements. In accordance with the present invention, the ignition circuit is controlled such that when a specific voltage has been reached at the capacitor $C_t$, the energy of the capacitor $C_5$ is applied to the igniter output 52.

The entire switching circuit of FIG. 7 is supplied by the electrical current supply source of the vehicle, for example in the voltage range from 10 to 14.5 V. The diode $D_1$, the Zener diode $ZD_2$, the resistors $R_{16}$, $R_{17}$, $R_{18}$, $R_{19}$, and the capacitor $C_6$ represent the current supply section 10, of FIGS. 1 and 2, wherein the positive pole 55 is grounded at 59 via the resistor $R_{19}$ and the capacitor $C_6$. This section serves furthermore for the stabilization and for the provision of various voltages for the subsequent switching circuit. The capacitor $C_7$ serves as the reserve energy source 9 and this capacitor is charged when the current supply section 10 is activated. In the event of failure of the vehicle supply or other failure, the capacitor serves as the energy source for the triggering of the safety mechanism for a predetermined period.

The control element or the diagnostic circuit 8 is formed essentially of a logic integrated component, i.e., a quadruple NAND-gate 58. Two of the NAND gates serve for inverting the signal applied thereto, while their outputs are connected to the inputs of a further NAND-gate. The use of a quadruple NAND-gate 58, which is, for example, of the type SN 5400, has the advantage that it is unnecessary to employ several different logic elements. The Zener diode $ZD_1$ and the resistor $R_{15}$ serve for processing the signals for controlling the entire electric voltage level of the total circuit. Essentially all switching circuits are controlled thereby, since the voltage level in the Zener diode $ZD_1$ changes when any of the components is disturbed. The Zener diode normally passes a small current which drives, via the series resistor $R_{24}$, the transistor $T_7$, so that a signal appears at the NAND gate. When the voltage drops below the conductive level of the Zener diode $ZD_1$, however, no signal appears at the NAND gate such that a disturbance signal is triggered.

The igniter circuit output is connected, via the resistor $R_{22}$, with an input of one of the signal inverting NAND gates, whereby a determination is obtained whether the ignition means has shorted out, i.e. has an infinite resistance, or whether there are cable flaws in the lead line of the air bag system for which the sensor of this invention is suitable, for example. The pressure of the compressed-air bottles necessary for the air bag system is controlled by means of a pressure switch 53 which is opened when the pressure is too low. The resistors $R_{25}$ and $R_{26}$ serve for processing the signal for the control of the bottle pressure, which is likewise controlled via one of the NAND gates, so that a disturbance is signalled when the pressure is too low. The disturbance indication takes place via the diodes $D_2$ and $D_3$ in conjunction with the resistors $R_{20}$ and $R_{21}$, as well as the transistor $T_6$, which latter switches on a warning lamp 57 at the dashboard of the vehicle and thus indicates a disturbance in the system.

In accordance with the embodiment shown in FIG. 2, the amplifier stage E and the succeeding amplifier stage D of the circuit of FIG. 7 are adjusted in such a manner that the transistor $T_5$ is opened and closed in proportion to the pattern of the deceleration-time curve. The timer $R_tC_t$ then operates as an integrator. If the curve exhibits zero-transitions, the integral does not reach the predetermined threshold value, so that the ignition circuit 7 cannot be tripped. The safety switching circuit 4 illustrated in FIG. 2 is likewise formed by the total switching circuit in this embodiment.

When the diagnostic circuit 8 does not indicate a disturbance, the sensor is ready for operation. Upon the occurrence of a deceleration of the vehicle, for example caused by impingement against an obstacle, the piezoelectric pickup transducer means 1 transmits, via the impedance amplifier 2, an electric signal proportional to the deceleration to the amplifier E. Depending on the adjustment of the following switching circuits, the subsequent switching circuits D and E operate as an integrator or as a triggering member.

In case of the trigger function, the ammplifier stage D switches at the threshold value preliminarily adjusted with the potentiometer, which is set, for example, to 8 g. A voltage jump occurs spontaneously at the resistor $R_9$ and the transistors $T_3$ and $T_4$ operate as triggers and actuate the delay unit 6. After elapse of the predetermined delay time, the ignition circuit connects the energy of the capacitor $C_5$ to the igniter output. In case of the functioning as integration amplifier, the amplifier stage D does not operate as a threshold trigger stage, but rather as a proportional amplifier. A voltage proportional to the signal produced at the piezoelectric pickup means 1 appears at the resistor $R_9$ and in this case, the transistors $T_3$, $T_4$ and $T_5$ operate as follow-up amplifiers. The transistor $T_5$ is opened and closed in proportion to the signal at the piezoelectric pickup transducer means 1.

The safety switching circuit 4 is formed by the impedance amplifier 2, the amplifier stage E, the amplifier trigger stage D, and the delay switching circuit 6. Upon the occurrence of voltage peaks, within a delay time determined by the timer $R_tC_t$ as well as the elements $R_{12}$ and $R_{13}$ and $T_5$, caused by impact and shock stresses, which voltage peaks have a high-frequency characteristic in any event, the transistor $T_5$ switches, in accordance with the zero transitions of the improper oscillation signal, the control electrode of the module 51 to zero potential such that no control voltage can build up at the timer $R_tC_t$ for the ignition of the module 51. The choice of the operating points of the transistors $T_2$, $T_4$ and $T_5$ makes it possible to ensure this safety function in both modes of operation, namely as a triggering arrangement of FIG. 1 as well as an integrator arrangement of FIG. 2.

Figure 8:
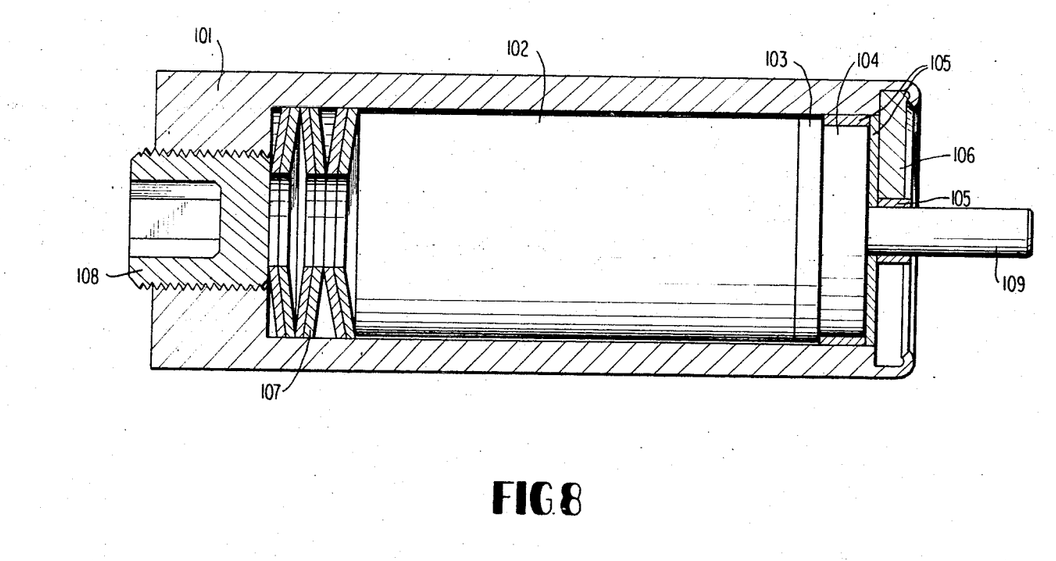
FIG. 8 is a sectional view of a piezoelectric acceleration pickup transducer means in accordance with the present invention.

The piezoelectric pickup transducer means 1 is illustrated in FIG. 8 and comprises a housing 101, provided at its front face with a screw 108, for example a headless screw with an internal hexagonal recess. The screw 108 serves for biasing a piezoelectric pellet 103 disposed within the housing 101, via cup springs 107 and an impact mass 102. The piezoelectric pellet 103 is connected with the pole 109, extended in an insulated manner through the housing 101, via a contact piece 104 shielded with respect to the housing 101 by insulation 105. The housing 101 is closed by a cover plate 106. The biasing of the piezoelectric pellet 103 is necessary in order to provide a maximally uniform sensitivity and thus to exclude temperature influences, for example. The biasing can be effected, for example, by tightening the screw 108 by means of a torque wrench.

The entire switching circuit as illlustrated in FIG. 7 can, if necessary, be constructed as an integrated component, including the piezoelectric pickup transducer means 1, so that the sensor occupies hardly any space at all and can be made to be very rugged, i.e. essentially trouble-free. The dimensions of the piezoelectric pickup transducer means 1 are approximately on the order of about 4 cm. in height and 1.5 cm. outer diameter.

The sensor system of the present invention can, of course, be utilized advantageously not only in conjunction with the air bag system, but also, for example, together with safety catch nets, safety belts which are tightened in case of a crash, or comparable devices.

Obviously, many modifications and variations of the present invention are possible in the light of the above teachings. It should therefore be understood that within the scope of the appended claims, the invention may be practiced otherwise than as specifically described.

We claim:

1. An electronic sensing system for triggering the actuation of a safety mechanism during a vehicle collision comprising acceleration pickup transducer means responsive to vehicle shock acceleration for providing an output signal indicative thereof, evaluating and safety triggering circuit means for processing the output signal of the transducer means in accordance with predetermined dynamic deformation characteristics of the vehicle, said evaluating and safety circuit means including threshold means providing first and second threshold values and for providing triggering output signal upon the output signal of said transducer means exceeding the first and second threshold values, and ignition circuit means responsive to the triggering signal for actuating the safety mechanism.

2. A sensing system according to claim 1, wherein said threshold value means includes delay means providing the second threshold value in the form of a predetermined delay period corresponding to the predetermined deformation characteristics of the vehicle, said delay means being arranged before said ignition circuit means for providing a triggering output signal to said ignition circuit means.

3. A sensing system according to claim 2, wherein said delay means is responsive to a signal of said transducer means exceeding the first threshold value and being present for said predetermined delay period for providing the triggering output signal.

4. A sensing system according to claim 1, wherein said evaluating and safety circuit means includes filtering means for filtering the signal of said transducer means.

5. A sensing system according to claim 1, wherein said evaluating and safety circuit means includes filtering means for filtering the signal of said transducer means, said threshold means including triggering means responsive to the filtered signal for providing an output signal upon exceeding the first threshold value and delay means responsive to the output of the triggering means for a predetermined time period corresponding to the second threshold value for providing a triggering output signal.

6. A sensing system according to claim 2, wherein said delay means provides a predetermined delay period in the range of 1 to 50 ms.

7. A sensing system according to claim 6, wherein the predetermined delay period is in the range of 3 to 6 ms.

8. A sensing system according to claim 1, wherein said threshold means includes integrator means for integrating the signal of said transducer means for providing a triggering signal.

9. A sensing system according to claim 1, wherein said threshold means includes triggering means responsive to the output of said transducer means for initiating a triggering signal, said triggering means forming an integrator means.

10. A sensing system according to claim 1, wherein said transducer means is a piezoelectric transducer means having a natural frequency in the range of 10 to 100 kilohertz.

11. A sensing system according to claim 1, wherein said transducer means is a piezoelectric transducer means including a piezoelectric pellet and means for biasing an impact mass toward said piezoelectric pellet.

12. A sensing system according to claim 11, wherein said biasing means includes cup spring means and screw means, said screw means being adjustable for varying the force of said cup spring means on said impact mass.

13. A sensing system according to claim 1, wherein said sensing system is arranged for connection with a primary power source, said sensing system including a reserve power source.

14. A sensing system according to claim 13, wherein the primary power source is the electrical means of the vehicle, and the reserve power source is a capacitor means.

15. A sensing system according to claim 1, further comprising control circuit means for controlling the operability of the sensing system and for indicating the functional operability thereof.

16. A sensing system according to claim 15, wherein the control circuit means includes logic switching circuit means.

17. A sensing system according to claim 16, wherein the logic switching circuit means comprises a quadruple NAND-gate logic element.

18. A sensing system according to claim 16, wherein said control circuit means includes means for controlling the voltage level of said sensing system.

19. A sensing system according to claim 18, wherein said means for controlling the voltage level includes a Zener diode.

20. A sensing system according to claim 1, wherein said ignition circuit means includes switching means connected to capacitor means and resistor means, said switching means being responsive to the triggering signal of said evaluating and safety circuit means for connecting the output of said capacitor means as the output of said ignition circuit means for actuating the safety mechanism.

21. A sensing system according to claim 20, wherein said switching means is an integrated circuit component having a thyristor characteristic in the anode-cathode path thereof and the characteristic of an exact trigger diode in the control circuit thereof.

22. A sensing system according to claim 1, wherein the evaluating and safety circuit means includes amplifier means serving as an impedance amplifier for amplifying the output of said transducer means.

23. A sensing system according to claim 1, wherein said sensing system is an integrated circuit module.

24. A sensing system according to claim 5, wherein said sensing system is arranged for connection with a primary power source and said sensing system includes a reserve power source.

25. A sensing system according to claim 24, further comprising control circuit means for controlling the operability of said sensing system and for indicating the functional operability thereof.

26. A sensing system according to claim 25, wherein the control circuit means includes means for controlling the voltage level supplied by said power source means to said sensing system.

27. A sensing system according to claim 26, wherein said evaluating and safety circuit means includes amplifier means for amplifying the output of said transducer means and for providing an amplified output signal to said filtering means.

28. A sensing system according to claim 8, wherein said integrator means is provided with the second threshold value corresponding to the predetermined deformation characteristics of the vehicle, said integrator means providing a triggering signal in response to the integration of the signal of said transducer means attaining said predetermined threshold value.

29. A sensing system according to claim 28, wherein said sensing system is arranged for connection with a primary power source and said sensing system includes a reserve power source.

30. A sensing system according to claim 29, further comprising control circuit means for controlling the operability of said sensing system and for indicating the functional operability thereof.

31. A sensing system according to claim 30, wherein the control circuit means includes means for controlling the voltage level applied by said power source means to said sensing system.

32. A sensing system according to claim 31, wherein said ignition circuit means includes switching means connected to capacitor means and resistor means, said switching means being responsive to the output of said integrator means for connecting the output of said capacitor means as the output of said ignition circuit means for actuating the safety mechanism.

33. A sensing system according to claim 32, wherein said evaluating and safety circuit means includes amplifier means for amplifying the output of said transducer means and providing an amplified signal to the integrator means.

34. A sensing system according to claim 33, wherein the sensing system is an integrated circuit module.

* * * * *